(12) United States Patent
Ryu et al.

(10) Patent No.: US 12,063,652 B2
(45) Date of Patent: Aug. 13, 2024

(54) SIMULTANEOUS SPATIAL RELATION UPDATE CAPABILITY INDICATION

(71) Applicant: QUALCOMM Incorporated, San Diego, CA (US)

(72) Inventors: Jung Ho Ryu, Fort Lee, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 246 days.

(21) Appl. No.: 17/248,350

(22) Filed: Jan. 21, 2021

(65) Prior Publication Data

US 2021/0243755 A1 Aug. 5, 2021

Related U.S. Application Data

(60) Provisional application No. 62/968,895, filed on Jan. 31, 2020.

(51) Int. Cl.
*H04W 72/21* (2023.01)
*H04W 72/044* (2023.01)

(52) U.S. Cl.
CPC ......... *H04W 72/21* (2023.01); *H04W 72/046* (2013.01)

(58) Field of Classification Search
CPC ............ H04W 72/0413; H04W 72/046; H04W 72/21
See application file for complete search history.

(56) References Cited

U.S. PATENT DOCUMENTS

| | | | |
|---|---|---|---|
| 2013/0051288 A1* | 2/2013 | Yamada | H04W 28/18 370/280 |
| 2021/0067979 A1* | 3/2021 | Rahman | H04L 5/0023 |
| 2021/0143922 A1* | 5/2021 | Jin | H04W 24/08 |
| 2021/0143964 A1* | 5/2021 | Frenne | H04B 7/08 |
| 2022/0053483 A1* | 2/2022 | Yoshioka | H04W 72/0413 |
| 2022/0182899 A1* | 6/2022 | Li | H04W 72/21 |
| 2022/0264323 A1* | 8/2022 | Yang | H04L 5/0051 |
| 2022/0287020 A1* | 9/2022 | Park | H04B 7/0695 |
| 2022/0287054 A1* | 9/2022 | Kim | H04W 72/569 |
| 2022/0330230 A1* | 10/2022 | Takahashi | H04L 5/0053 |
| 2023/0017292 A1* | 1/2023 | Liu | H04L 5/0091 |
| 2023/0048881 A1* | 2/2023 | Zhu | H04L 5/0051 |

* cited by examiner

*Primary Examiner* — Jasper Kwoh
(74) *Attorney, Agent, or Firm* — Harrity & Harrity, LLP

(57) ABSTRACT

A user equipment may receive information indicating whether a reference signal is associated with a full-duplex operation; receive the reference signal; and transmit feedback based at least in part on the reference signal and the information indicating whether the reference signal is associated with the full-duplex operation.

28 Claims, 7 Drawing Sheets

SIMULTANEOUS SPATIAL RELATION UPDATE CAPABILITY INDICATION

CROSS-REFERENCE TO RELATED APPLICATION

This Patent application claims priority to U.S. Provisional Patent Application No. 62/968,895, filed on Jan. 31, 2020, entitled "SIMULTANEOUS SPATIAL RELATION UPDATE CAPABILITY INDICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for simultaneous spatial relation update capability indication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

A UE may be configured with one or more physical uplink control channel (PUCCH) resource groups. In some wireless telecommunication systems, the UE may receive, from a base station (BS), a simultaneous spatial relation update for PUCCH resources of a PUCCH resource group. However, in some instances, the UE may not be enabled to provide an indication to a BS that the UE is capable of performing a simultaneous spatial relation update for a PUCCH resource group. Accordingly, the UE and the BS may not achieve signaling and updating efficiencies associated with simultaneous spatial relation updating.

SUMMARY

In some aspects, a method of wireless communication, performed by a user equipment (UE), may include transmitting, to a base station, an indication of whether the UE is enabled to receive a simultaneous spatial relation update for a physical uplink control channel (PUCCH) resource group of PUCCH resources that share a same spatial relation. The method may include receiving, from the base station based at least in part on the indication, the simultaneous spatial relation update for the PUCCH resource group.

In some aspects, a method of wireless communication, performed by a base station (BS), may include receiving, from a UE, an indication of whether the UE is enabled to receive a simultaneous spatial relation update for a PUCCH resource group of PUCCH resources that share a same spatial relation. The method may include transmitting, to the UE based at least in part on the indication, the simultaneous spatial relation update for the PUCCH resource group.

In some aspects, a UE for wireless communication may include memory and one or more processors operatively coupled to the memory. The memory and the one or more processors may be configured to transmit, to a base station, an indication of whether the UE is enabled to receive a simultaneous spatial relation update for a PUCCH resource group of PUCCH resources that share a same spatial relation. The memory and the one or more processors may be configured to receive, from the base station based at least in part on the indication, the simultaneous spatial relation update for the PUCCH resource group.

In some aspects, a BS for wireless communication may include memory and one or more processors operatively coupled to the memory. The memory and the one or more processors may be configured to receive, from a UE, an indication of whether the UE is enabled to receive a simultaneous spatial relation update for a PUCCH resource group of PUCCH resources that share a same spatial relation. The memory and the one or more processors may be configured to transmit, to the UE based at least in part on the indication, the simultaneous spatial relation update for the PUCCH resource group.

In some aspects, a non-transitory computer-readable medium may store one or more instructions for wireless communication. The one or more instructions, when executed by one or more processors of a UE, may cause the one or more processors to transmit, to a base station, an indication of whether the UE is enabled to receive a simultaneous spatial relation update for a PUCCH resource group of PUCCH resources that share a same spatial relation. The one or more instructions, when executed by the one or more processors of the UE, may cause the one or more processors to receive, from the base station based at least in part on the indication, the simultaneous spatial relation update for the PUCCH resource group.

In some aspects, a non-transitory computer-readable medium may store one or more instructions for wireless communication. The one or more instructions, when executed by one or more processors of a BS, may cause the one or more processors to receive, from a UE, an indication of whether the UE is enabled to receive a simultaneous spatial relation update for a PUCCH resource group of PUCCH resources that share a same spatial relation. The one or more instructions, when executed by the one or more processors of the BS, may cause the one or more processors to transmit, to the UE based at least in part on the indication, the simultaneous spatial relation update for the PUCCH resource group.

In some aspects, an apparatus for wireless communication may include means for transmitting, to a base station, an indication of whether the apparatus is enabled to receive a simultaneous spatial relation update for a PUCCH resource group of PUCCH resources that share a same spatial relation. The apparatus may include means for receiving, from the base station based at least in part on the indication, the simultaneous spatial relation update for the PUCCH resource group.

In some aspects, an apparatus for wireless communication may include means for receiving, from a UE, an indication of whether the UE is enabled to receive a simultaneous spatial relation update for a PUCCH resource group of PUCCH resources that share a same spatial relation. The apparatus may include means for transmitting, to the UE based at least in part on the indication, the simultaneous spatial relation update for the PUCCH resource group.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
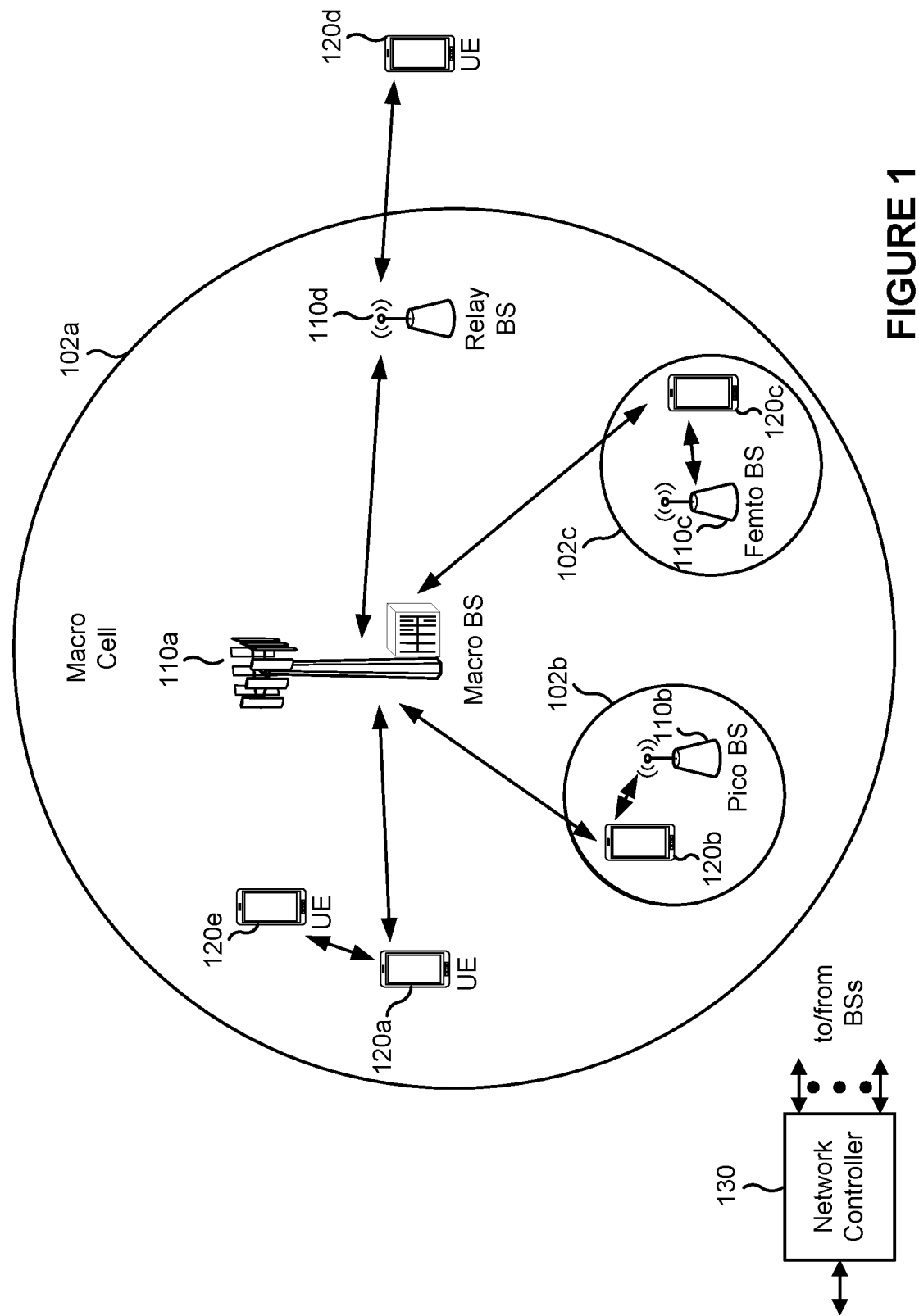
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

Various aspects relate generally to a simultaneous spatial relation update for a physical uplink control channel (PUCCH) resource group. Some aspects more specifically relate to the use of a single spatial relation update for the PUCCH resource group that identifies a spatial relation (that is, a beam) that a user equipment (UE) is to use for PUCCH resources of the PUCCH resource group. In some aspects, a UE may indicate, to a base station (BS), whether the UE is capable of simultaneous spatial relation updating for PUCCH resource groups for respective bandwidth parts.

Particular aspects of the subject matter described in this disclosure can be implemented to realize one or more of the following potential advantages. In some examples, the described techniques can be used to facilitate efficient updating of spatial relations of PUCCH resources. For example, a single spatial relation update can be applied to multiple PUCCH resources of a PUCCH resource group. This improves signaling efficiency by reducing signaling overhead, which conserves network resources as well as computing resources of the UE and the BS.

FIG. 1 is a block diagram illustrating an example wireless network in accordance with various aspects of the present disclosure. The wireless network may be a Long Term Evolution (LTE) network or some other wireless network, such as a 5G or NR network. The wireless network may include a quantity of BSs 110 (shown as BS 110a, BS 110b, BS 110c, and BS 110d) and other network entities. A BS is an entity that communicates with UEs and may also be referred to as a Node B, an eNodeB, an eNB, a gNB, a NR BS, a 5G node B (NB), an access point (AP), or a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network through various types of backhaul interfaces such as a direct physical connection, or a virtual network, among other examples, or combinations thereof using any suitable transport network.

The wireless network may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay, among other examples, or combinations thereof.

UEs 120 (for example, 120a, 120b, 120c) may be dispersed throughout the wireless network, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Figure 2:
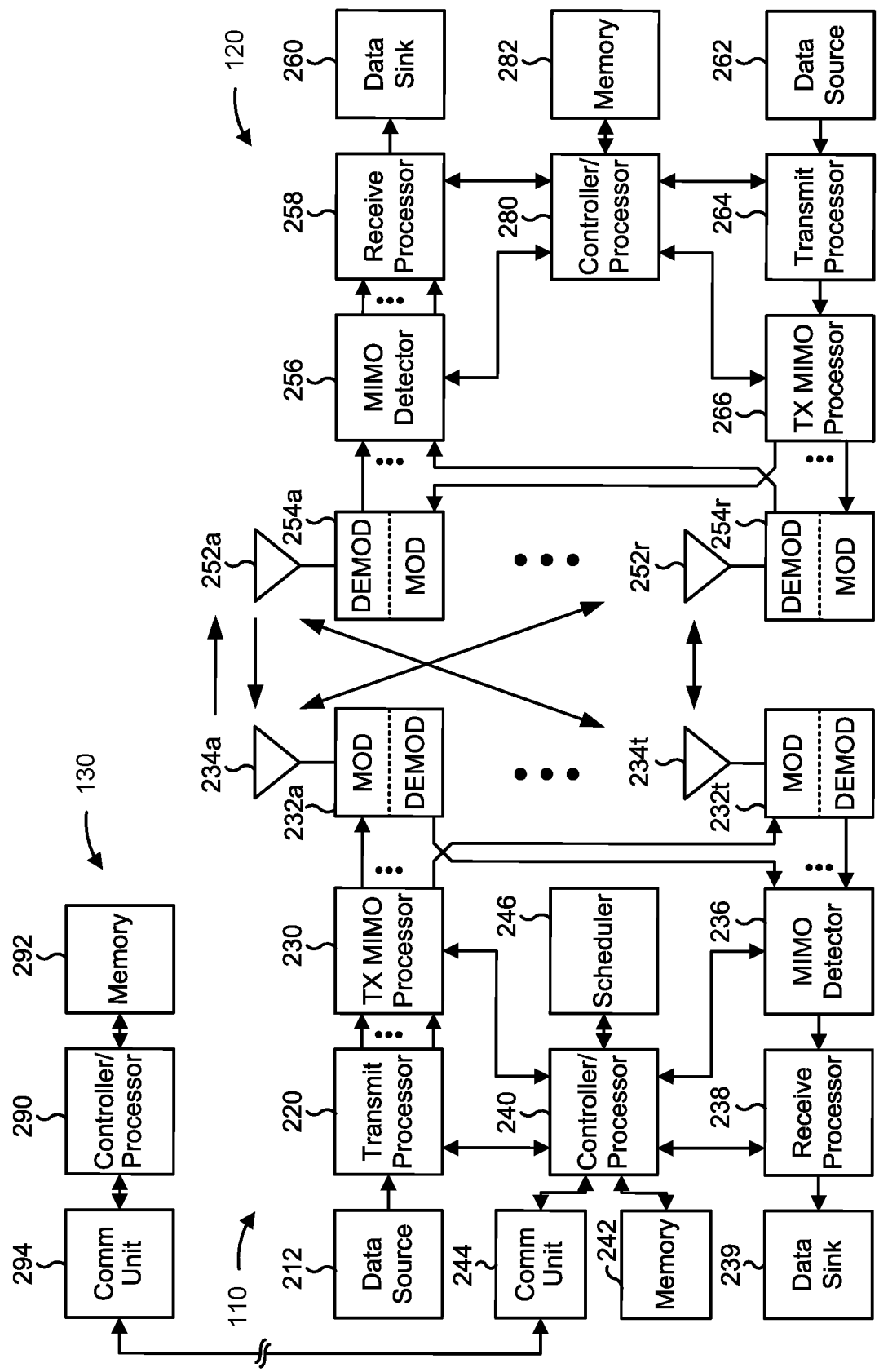
FIG. 2 is a block diagram illustrating an example base station (BS) in communication with a user equipment (UE) in a wireless network in accordance with various aspects of the present disclosure.

FIG. 2 is a block diagram illustrating an example BS in communication with a UE in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with simultaneous spatial relation update capability indication, as described in more detail elsewhere herein. For example, controller/processor 240 of base station 110, controller/processor 280 of UE 120, or any other component(s) of FIG. 2 may perform or direct operations of, for example, process 400 of FIG. 4, process 500 of FIG. 5, or other processes as described herein. Memories 242 and 282 may store data and program codes for base station 110 and UE 120, respectively. A scheduler 246 may schedule UEs for data transmission on the downlink or uplink.

In some aspects, UE 120 may include means for transmitting, to a base station, an indication of whether the UE is enabled to receive a simultaneous spatial relation update for a PUCCH resource group of PUCCH resources that share a same spatial relation, means for receiving, from the base station based at least in part on the indication, the simultaneous spatial relation update for the PUCCH resource group, among other examples, or combinations thereof. In some aspects, such means may include one or more components of UE 120 described in connection with FIG. 2.

In some aspects, base station 110 may include means for receiving, from a UE, an indication of whether the UE is enabled to receive a simultaneous spatial relation update for a PUCCH resource group of PUCCH resources that share a same spatial relation, means for transmitting, to the UE based at least in part on the indication, the simultaneous spatial relation update for the PUCCH resource group, among other examples, or combinations thereof. In some aspects, such means may include one or more components of base station 110 described in connection with FIG. 2.

As described above, a UE may be configured with one or more PUCCH resource groups. A PUCCH resource group may include one or more PUCCH resources that share the same spatial relation. That is, the UE may use a particular beam indicated by the spatial relation when communicating in a PUCCH resource of the PUCCH resource group.

Various aspects relate generally to a simultaneous spatial relation update for a PUCCH resource group. Some aspects more specifically relate to the use of a single spatial relation update for the PUCCH resource group that identifies a spatial relation (that is, a beam) that the UE is to use for PUCCH resources of the PUCCH resource group. In some aspects, the UE may indicate, to a BS, whether the UE is capable of simultaneous spatial relation updating for PUCCH resource groups for respective bandwidth parts.

Particular aspects of the subject matter described in this disclosure can be implemented to realize one or more of the following potential advantages. In some examples, the described techniques can be used to facilitate efficient updating of spatial relations of PUCCH resources. For example, a single spatial relation update can be applied to multiple PUCCH resources of a PUCCH resource group. This improves signaling efficiency by reducing signaling overhead, which conserves network resources as well as computing resources of the UE and the BS.

Figure 3:
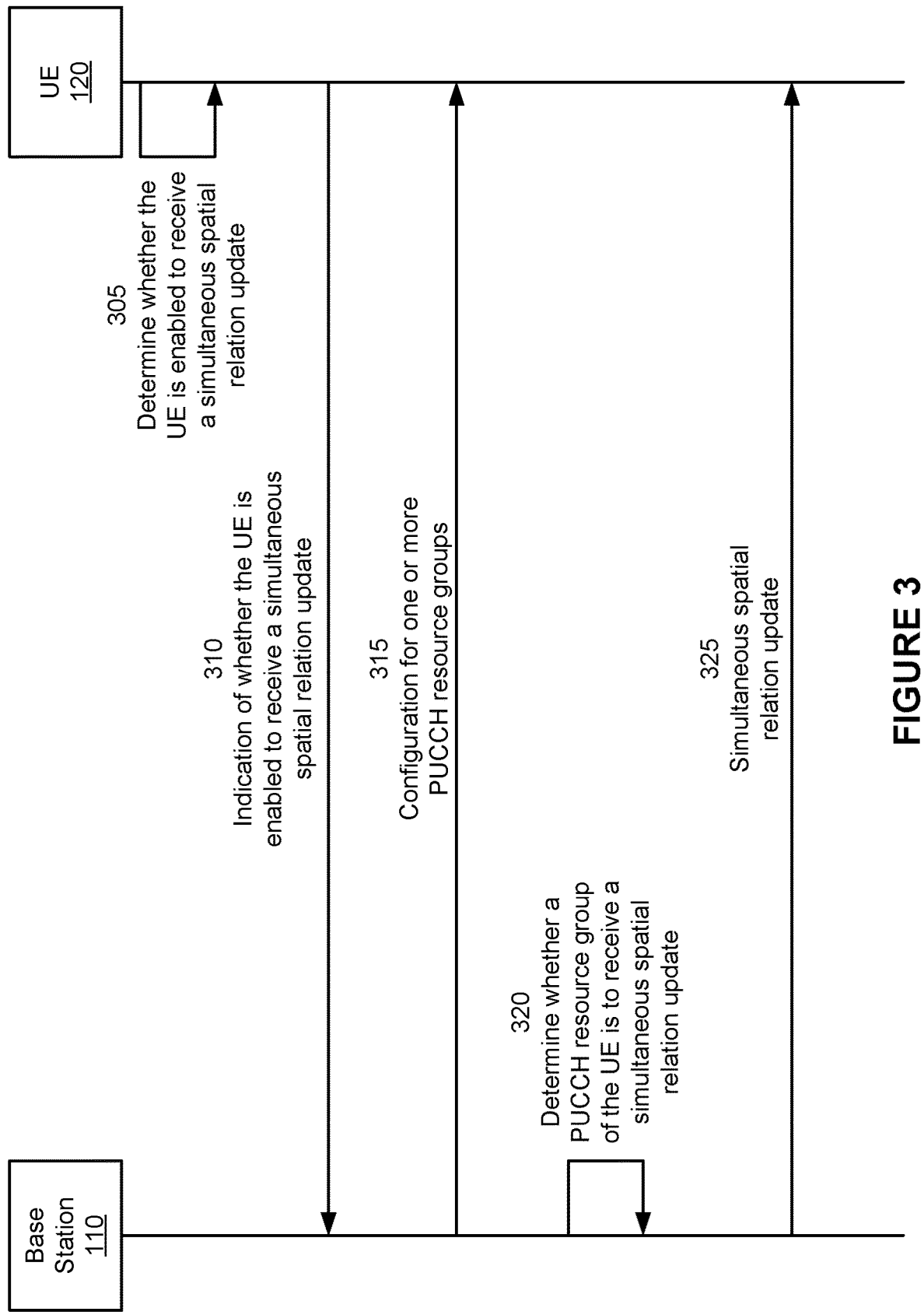
FIG. 3 is a diagram illustrating an example associated with simultaneous spatial relation update capability indication in accordance with various aspects of the present disclosure.

FIG. 3 is a diagram illustrating an example associated with simultaneous spatial relation update capability indication in accordance with various aspects of the present disclosure. In some aspects, a BS 110 and a UE 120 may communicate in connection with updating spatial relations for PUCCH resources. In a first operation 305, the UE 120 may determine whether the UE 120 is enabled to receive a simultaneous spatial relation update for a PUCCH resource group (for example, based at least in part on a capability of the UE 120 or a configuration of the UE 120). In a second operation 310, the UE 120 may transmit, and the BS 110 may receive, an indication of whether the UE 120 is enabled to receive a simultaneous spatial relation update. For example, the UE 120 may transmit the indication via RRC signaling, such as in a UE capability information message.

In some aspects, the indication is a particular value to indicate that the UE 120 is not enabled to receive a simultaneous spatial relation update. For example, the particular value may be zero. In some aspects, the indication is a quantity of PUCCH resource groups (for example, 1, 2, 3, or 4 PUCCH resource groups) to indicate that the UE 120 is enabled to receive a simultaneous spatial relation update. The quantity of PUCCH resource groups may indicate a maximum quantity of PUCCH resource groups, in a bandwidth part (BWP), that may be enabled for simultaneous spatial relation updating. That is, the quantity of PUCCH resource groups may indicate a quantity of PUCCH resource groups, in a BWP, that include respective sets of PUCCH resources sharing the same spatial relation.

In some aspects, the UE 120 may be configured to use one or more BWPs. Accordingly, the indication that the UE 120 is enabled to receive a simultaneous spatial relation update may indicate that PUCCH resource groups for respective BWPs (that is, per BWP) may be enabled for simultaneous spatial relation updating. The BWPs may be on a single component carrier. The component carrier may be in a frequency band in a millimeter wave (mmWave) spectrum. The mmWave spectrum may include frequency bands above approximately 24 gigahertz (also known as Frequency Range 2). In some aspects, the component carrier may have a time division duplexing configuration.

In a third operation 315, the BS 110 may configure the UE 120 with one or more PUCCH resource groups (for example, via radio resource control (RRC) signaling). The UE 120 may be configured with the same quantity of PUCCH resource groups per BWP. In other words, the UE 120 may be configured with a quantity of PUCCH resource groups (for example, 1, 2, 3, or 4) on a first BWP, and may be configured with the same quantity of PUCCH resource groups on a second BWP. A PUCCH resource group may include one or more PUCCH resources that share the same spatial relation, and that the UE 120 is to use to for uplink communications (for example, for communicating uplink control information, acknowledgment feedback, among other examples).

In a fourth operation 320, the BS 110 may determine whether a PUCCH resource group of the UE 120 is to receive a simultaneous spatial relation update based at least in part on the indication transmitted by the UE 120. For example, the BS 110 may determine that a PUCCH resource group of the UE 120 is to receive a simultaneous spatial relation update based at least in part on the indication indicating that the UE 120 is enabled to receive a simultaneous spatial relation update. Accordingly, in a fifth operation 325, the BS 110 may transmit a simultaneous spatial relation update (for example, via a medium access control control element (MAC-CE) or RRC signaling) for the PUCCH resource group of the UE 120. In this way, spatial relations of PUCCH resources of the PUCCH resource group may be updated with improved efficiency. For example, the UE and the BS may update a spatial relation for a PUCCH resource with improved efficiency.

Figure 4:
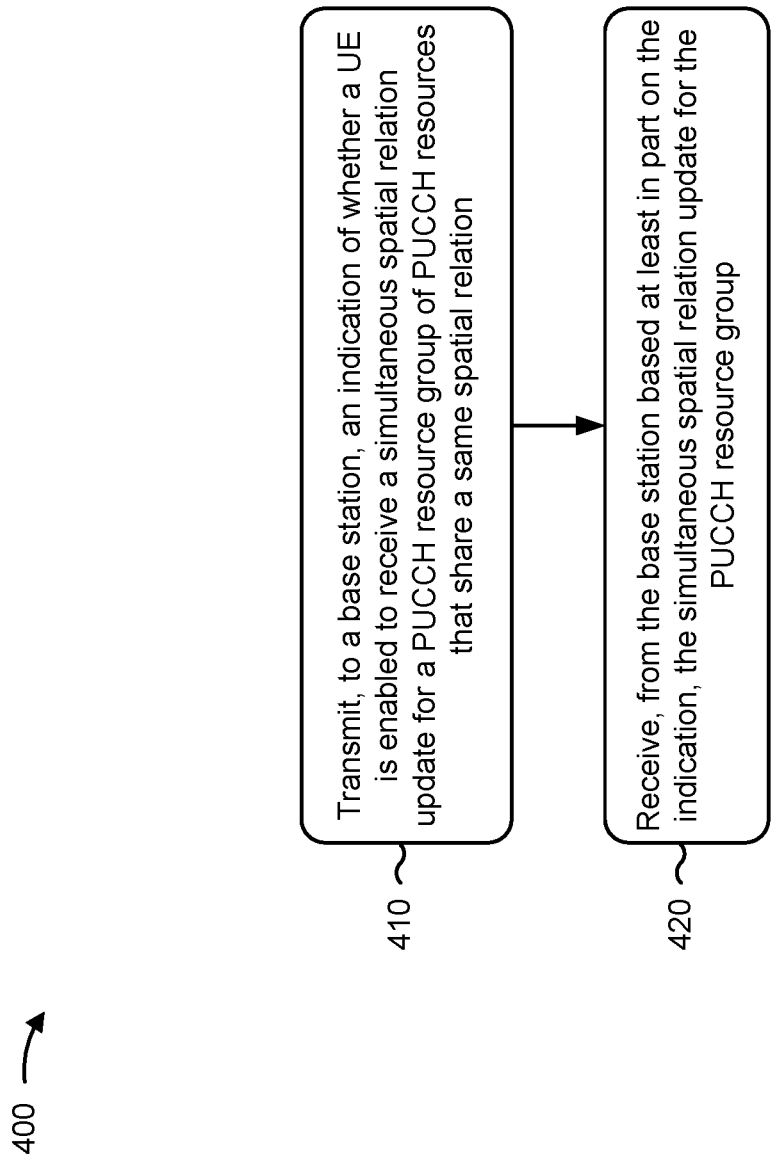
FIG. 4 is a flowchart illustrating an example process of simultaneous spatial relation update capability indication performed by a UE in accordance with various aspects of the present disclosure.

FIG. 4 is a diagram illustrating an example process 400 of simultaneous spatial relation update capability indication performed, for example, by a UE, in accordance with various aspects of the present disclosure. Example process 400 is an example where the UE, such as UE 120, performs operations associated with simultaneous spatial relation update capability indication.

As shown in FIG. 4, in some aspects, process 400 may include transmitting, to a base station, an indication of whether a UE is enabled to receive a simultaneous spatial relation update for a PUCCH resource group of PUCCH resources that share a same spatial relation (block 410). For example, the UE (for example, using controller/processor 280 or another component) may transmit, to a base station, an indication of whether the UE is enabled to receive a simultaneous spatial relation update for a PUCCH resource group of PUCCH resources that share a same spatial relation, as described above. In some aspects, process 400 may include determining whether a UE is enabled to receive a simultaneous spatial relation update for a PUCCH resource group.

As further shown in FIG. 4, in some aspects, process 400 may include receiving, from the base station based at least in part on the indication, the simultaneous spatial relation update for the PUCCH resource group (block 420). For example, the UE (for example, using controller/processor 280, transmit processor 264, TX MIMO processor 266, MOD 254, antenna 252, or another component) may receive, from the base station based at least in part on the indication, the simultaneous spatial relation update for the PUCCH resource group, as described above.

Process 400 may include additional aspects, such as any single aspect or any combination of aspects described below or in connection with one or more other processes described elsewhere herein.

In a first additional aspect, the indication is transmitted in a UE capability information message. In a second additional aspect, alone or in combination with the first additional aspect, the indication is transmitted via radio resource control signaling.

In a third additional aspect, alone or in combination with one or more of the first and second additional aspects, the indication identifies a particular value to indicate that the UE is not enabled to receive the simultaneous spatial relation update. In a fourth additional aspect, alone or in combination with one or more of the first through third additional aspects, the indication identifies a quantity of PUCCH resource groups, in a bandwidth part, that can be enabled for respective simultaneous spatial relation updates, to indicate that the UE is enabled to receive the simultaneous spatial relation update.

In a fifth additional aspect, alone or in combination with one or more of the first through fourth additional aspects, the bandwidth part is on a single component carrier. In a sixth additional aspect, alone or in combination with one or more of the first through fifth additional aspects, the component carrier is in a millimeter wave frequency band. In a seventh additional aspect, alone or in combination with one or more of the first through sixth additional aspects, the component carrier has a time division duplexing configuration.

In an eighth additional aspect, alone or in combination with one or more of the first through seventh additional aspects, the indication indicates that the UE is enabled for simultaneous spatial relation updating of PUCCH resource groups for respective BWPs. In a ninth additional aspect, alone or in combination with one or more of the first through eighth additional aspects, process 400 further includes receiving a configuration for one or more PUCCH resource groups. In a tenth additional aspect, alone or in combination with one or more of the first through ninth additional aspects, process 400 further includes updating a spatial relation for a PUCCH resource, of the PUCCH resource group, based at least in part on the simultaneous spatial relation update. In an eleventh additional aspect, alone or in combination with one or more of the first through tenth additional aspects, process 400 further includes communicating in a PUCCH resource, of the PUCCH resource group, using a beam indicated by a spatial relation of the simultaneous spatial relation update.

Figure 5:
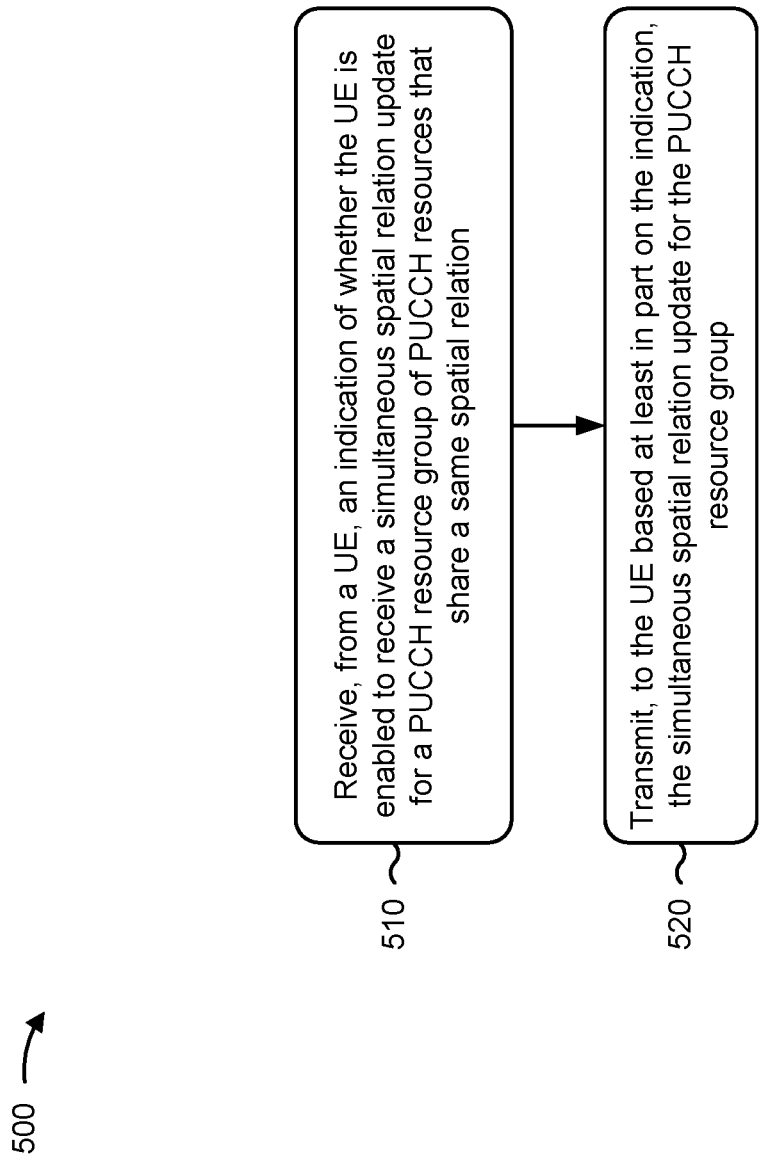
FIG. 5 is a flowchart illustrating an example process of simultaneous spatial relation update capability indication performed by a BS in accordance with various aspects of the present disclosure.

FIG. 5 is a diagram illustrating an example process 500 of simultaneous spatial relation update capability indication performed, for example, by a BS, in accordance with various aspects of the present disclosure. Example process 500 is an example where the BS, such as BS 110, performs operations associated with simultaneous spatial relation update capability indication.

As shown in FIG. 5, in some aspects, process 500 may include receiving, from a UE, an indication of whether the UE is enabled to receive a simultaneous spatial relation update for a PUCCH resource group of PUCCH resources that share a same spatial relation (block 510). For example, the BS (for example, using antenna 234, DEMOD 232, MIMO detector 236, receive processor 238, controller/processor 240, or another component) may receive, from a UE, an indication of whether the UE is enabled to receive a simultaneous spatial relation update for a PUCCH resource group of PUCCH resources that share a same spatial relation, as described above. In some aspects, process 500 may include determining whether the PUCCH resource group is to receive the simultaneous spatial relation update based at least in part on the indication.

As further shown in FIG. 5, in some aspects, process 500 may include transmitting, to the UE based at least in part on the indication, the simultaneous spatial relation update for the PUCCH resource group (block 520). For example, the BS (for example, using controller/processor 240 or another component) may transmit, to the UE based at least in part on the indication, the simultaneous spatial relation update for the PUCCH resource group, as described above.

Process 500 may include additional aspects, such as any single aspect or any combination of aspects described below or in connection with one or more other processes described elsewhere herein.

In a first additional aspect, the indication is received in a UE capability information message. In a second additional aspect, alone or in combination with the first additional aspect, the indication is received via radio resource control signaling.

In a third additional aspect, alone or in combination with one or more of the first and second additional aspects, the indication identifies a particular value to indicate that the UE is not enabled to receive the simultaneous spatial relation update. In a fourth additional aspect, alone or in combination with one or more of the first through third additional aspects, the indication identifies a quantity of PUCCH resource groups, in a bandwidth part, that can be enabled for respective simultaneous spatial relation updates, to indicate that the UE is enabled to receive the simultaneous spatial relation update.

In a fifth additional aspect, alone or in combination with one or more of the first through fourth additional aspects, the bandwidth part is on a single component carrier. In a sixth additional aspect, alone or in combination with one or more of the first through fifth additional aspects, the component carrier is in a millimeter wave frequency band. In a seventh additional aspect, alone or in combination with one or more of the first through sixth additional aspects, the component carrier has a time division duplexing configuration.

In an eighth additional aspect, alone or in combination with one or more of the first through seventh additional aspects, the indication indicates that the UE is enabled for simultaneous spatial relation updating of PUCCH resource groups for respective BWPs. In a ninth additional aspect, alone or in combination with one or more of the first through eighth additional aspects, process 500 further includes transmitting a configuration for one or more PUCCH resource groups.

Figure 6:
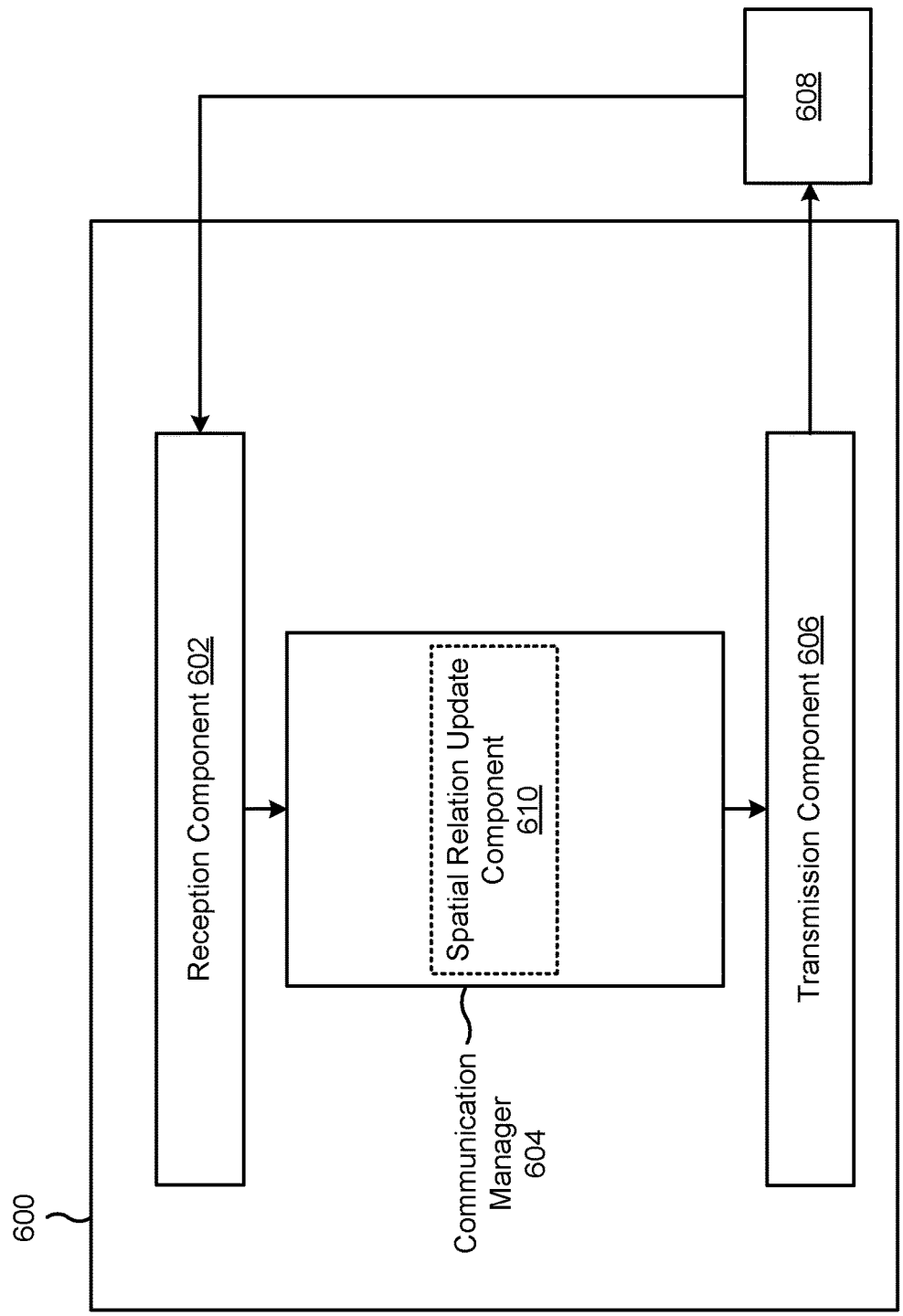
FIG. 6 is a block diagram of an example apparatus for wireless communication in accordance with various aspects of the present disclosure.

FIG. 6 is a block diagram of an example apparatus 600 for wireless communication in accordance with various aspects of the present disclosure. The apparatus 600 may be a UE, or a UE may include the apparatus 600. In some aspects, the apparatus 600 includes a reception component 602, a communication manager 604, and a transmission component 606, which may be in communication with one another (for example, via one or more buses). As shown, the apparatus 600 may communicate with another apparatus 608 (such as a UE, a base station, or another wireless communication device) using the reception component 602 and the transmission component 606.

In some aspects, the apparatus 600 may be configured to perform one or more operations described herein in connection with FIG. 3. Additionally or alternatively, the apparatus 600 may be configured to perform one or more processes described herein, such as process 400 of FIG. 4, or a combination thereof. In some aspects, the apparatus 600 may include one or more components of the UE described above in connection with FIG. 2.

The reception component 602 may receive communications, such as reference signals, control information, data communications, or a combination thereof, from the apparatus 608. The reception component 602 may provide received communications to one or more other components of the apparatus 600, such as the communication manager 604. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 602 may include one or more antennas, a demodulator, a MIMO detector, a receive processor, a controller/processor, a memory, or a combination thereof, of the UE described above in connection with FIG. 2.

The transmission component 606 may transmit communications, such as reference signals, control information, data communications, or a combination thereof, to the apparatus 608. In some aspects, the communication manager 604 may generate communications and may transmit the generated communications to the transmission component 606 for transmission to the apparatus 608. In some aspects, the transmission component 606 may perform signal processing on the generated communications (such as filtering, amplification, modulation, digital-to-analog conversion, multiplexing, interleaving, mapping, or encoding, among other examples), and may transmit the processed signals to the apparatus 608. In some aspects, the transmission component 606 may include one or more antennas, a modulator, a transmit MIMO processor, a transmit processor, a controller/processor, a memory, or a combination thereof, of the UE described above in connection with FIG. 2. In some aspects, the transmission component 606 may be co-located with the reception component 602 in a transceiver.

The communication manager 604 may transmit or may cause the transmission component 606 to transmit, to a base station, an indication of whether the apparatus 600 is enabled to receive a simultaneous spatial relation update for a PUCCH resource group of PUCCH resources that share a same spatial relation. The communication manager 604 may receive or may cause the reception component 602 to receive, from the base station based at least in part on the indication, the simultaneous spatial relation update for the PUCCH resource group. In some aspects, the communication manager 604 may perform one or more operations described elsewhere herein as being performed by one or more components of the communication manager 604.

The communication manager 604 may include a controller/processor, a memory, or a combination thereof, of the UE described above in connection with FIG. 2. In some aspects, the communication manager 604 includes a set of components, such as a spatial relation update component 610. Alternatively, the set of components may be separate and distinct from the communication manager 604. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The spatial relation update component 610 may determine whether the apparatus 600 is enabled to receive a simultaneous spatial relation update for a PUCCH resource group of PUCCH resources that share a same spatial relation. The transmission component 606 may transmit, to a base station, an indication of whether the apparatus 600 is enabled to receive a simultaneous spatial relation update for a PUCCH resource group of PUCCH resources that share a same spatial relation. The reception component 602 may receive a configuration for one or more PUCCH resource groups. The reception component 602 may receive, from the base station based at least in part on the indication, the simultaneous spatial relation update for a PUCCH resource group. In some aspects, the spatial relation update component 610 may update a spatial relation for a PUCCH resource, of the PUCCH resource group, based at least in part on the simultaneous spatial relation update. In some aspects, the transmission component 606 may communicate in a PUCCH resource, of the PUCCH resource group, using a beam indicated by a spatial relation of the simultaneous spatial relation update.

Figure 7:
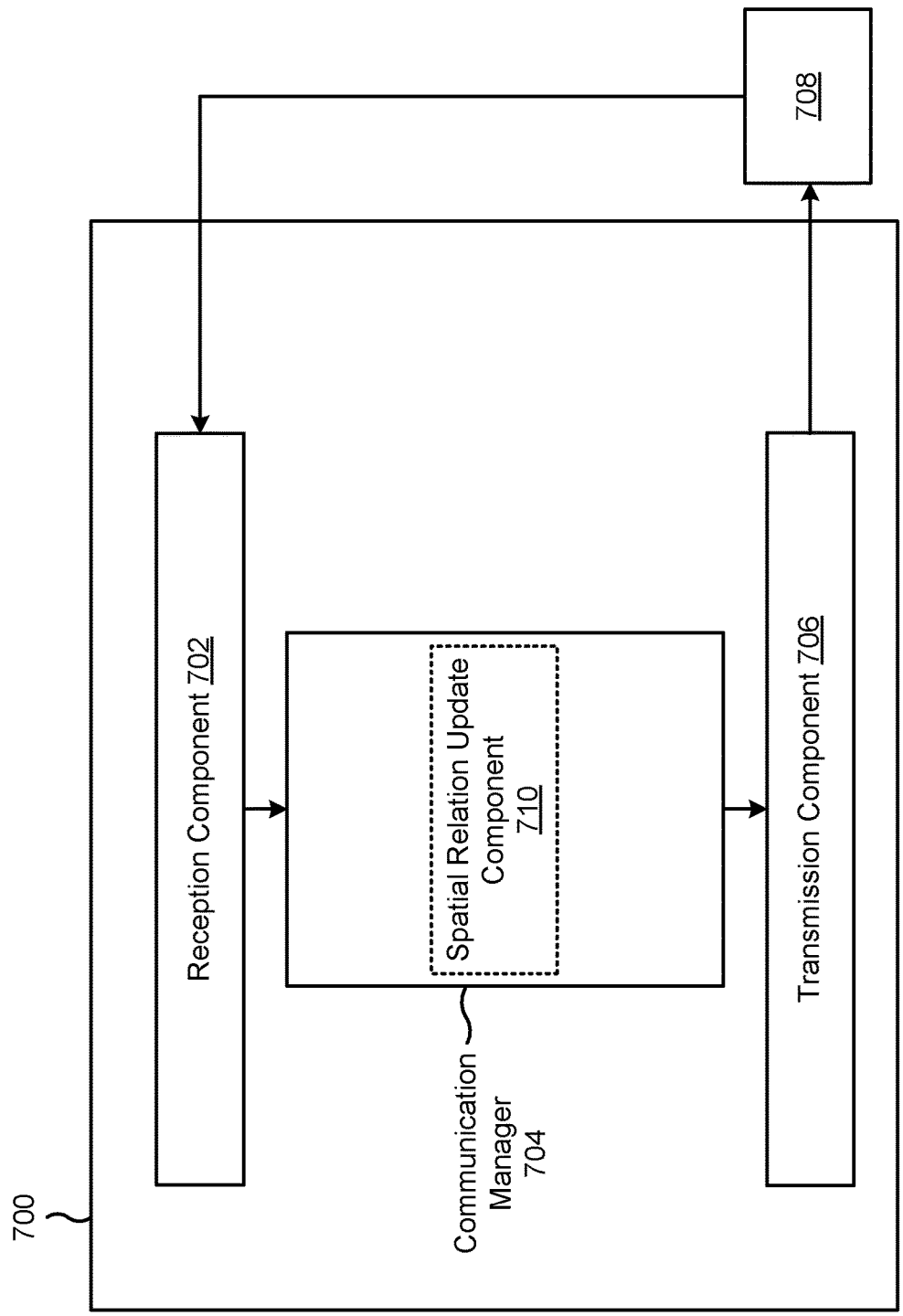
FIG. 7 is a block diagram of an example apparatus for wireless communication in accordance with various aspects of the present disclosure.

FIG. 7 is a block diagram of an example apparatus 700 for wireless communication in accordance with various aspects of the present disclosure. The apparatus 700 may be a BS, or a BS may include the apparatus 700. In some aspects, the apparatus 700 includes a reception component 702, a communication manager 704, and a transmission component 706, which may be in communication with one another (for example, via one or more buses). As shown, the apparatus 700 may communicate with another apparatus 708 (such as a UE, a base station, or another wireless communication device) using the reception component 702 and the transmission component 706.

In some aspects, the apparatus 700 may be configured to perform one or more operations described herein in connection with FIG. 3. Additionally or alternatively, the apparatus 700 may be configured to perform one or more processes described herein, such as process 500 of FIG. 5, or a combination thereof. In some aspects, the apparatus 700 may include one or more components of the BS described above in connection with FIG. 2.

The reception component 702 may receive communications, such as reference signals, control information, data communications, or a combination thereof, from the apparatus 708. The reception component 702 may provide received communications to one or more other components of the apparatus 700, such as the communication manager 704. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 702 may include one or more antennas, a demodulator, a MIMO detector, a receive processor, a controller/processor, a memory, or a combination thereof, of the BS described above in connection with FIG. 2.

The transmission component 706 may transmit communications, such as reference signals, control information, data communications, or a combination thereof, to the apparatus 708. In some aspects, the communication manager 704 may generate communications and may transmit the generated communications to the transmission component 706 for transmission to the apparatus 708. In some aspects, the transmission component 706 may perform signal processing on the generated communications (such as filtering, amplification, modulation, digital-to-analog conversion, multiplexing, interleaving, mapping, or encoding, among other examples), and may transmit the processed signals to the apparatus 708. In some aspects, the transmission component 706 may include one or more antennas, a modulator, a transmit MIMO processor, a transmit processor, a controller/processor, a memory, or a combination thereof, of the BS described above in connection with FIG. 2. In some aspects, the transmission component 706 may be co-located with the reception component 702 in a transceiver.

The communication manager 704 may receive or may cause the reception component 702 to receive, from a UE, an indication of whether the UE is enabled to receive a simultaneous spatial relation update for a PUCCH resource group of PUCCH resources that share a same spatial relation. The communication manager 704 may transmit or may cause the transmission component 706 to transmit, to the UE based at least in part on the indication, the simultaneous spatial relation update for the PUCCH resource group. In some aspects, the communication manager 704 may perform one or more operations described elsewhere herein as being performed by one or more components of the communication manager 704.

The communication manager 704 may include a controller/processor, a memory, a scheduler, a communication unit, or a combination thereof, of the BS described above in connection with FIG. 2. In some aspects, the communication manager 704 includes a set of components, such as a spatial relation update component 710. Alternatively, the set of components may be separate and distinct from the communication manager 704. In some aspects, one or more components of the set of components may include or may be implemented within a controller/processor, a memory, a scheduler, a communication unit, or a combination thereof, of the BS described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive, from a UE, an indication of whether the UE is enabled to receive a simultaneous spatial relation update for a PUCCH resource group of PUCCH resources that share a same spatial relation. The transmission component 706 may transmit a configuration for one or more PUCCH resource groups. The spatial relation update component 710 may determine whether a PUCCH resource group is to receive the simultaneous spatial relation update based at least in part on the indication. The transmission component 706 may transmit, to the UE based at least in part on the indication, the simultaneous spatial relation update for the PUCCH resource group.

The following provides an overview of some aspects of the present disclosure:

Aspect 1: A method of wireless communication performed by a user equipment (UE), comprising: transmitting, to a base station, an indication of whether the UE is enabled to receive a simultaneous spatial relation update for a physical uplink control channel (PUCCH) resource group of PUCCH resources that share a same spatial relation; and receiving, from the base station based at least in part on the indication, the simultaneous spatial relation update for the PUCCH resource group.

Aspect 2: The method of aspect 1, wherein the indication is transmitted in a UE capability information message.

Aspect 3: The method of any of aspects 1-2, wherein the indication is transmitted via radio resource control signaling.

Aspect 4: The method of any of aspects 1-3, wherein the indication indicates that the UE is enabled for simultaneous spatial relation updating of PUCCH resource groups for respective bandwidth parts.

Aspect 5: The method of any of aspects 1-4, wherein the indication identifies a particular value to indicate that the UE is not enabled to receive the simultaneous spatial relation update.

Aspect 6: The method of any of aspects 1-4, wherein the indication identifies a quantity of PUCCH resource groups, in a bandwidth part, that can be enabled for respective simultaneous spatial relation updates, to indicate that the UE is enabled to receive the simultaneous spatial relation update.

Aspect 7: The method of aspect 6, wherein the bandwidth part is on a single component carrier.

Aspect 8: The method of aspect 7, wherein the component carrier is in a millimeter wave frequency band.

Aspect 9: The method of any of aspects 7-8, wherein the component carrier has a time division duplexing configuration.

Aspect 10: The method of any of aspects 1-9, further comprising receiving a configuration for one or more PUCCH resource groups.

Aspect 11: The method of any of aspects 1-10, further comprising updating a spatial relation for a PUCCH resource, of the PUCCH resource group, based at least in part on the simultaneous spatial relation update.

Aspect 12: The method of any of aspects 1-11, further comprising communicating in a PUCCH resource, of the PUCCH resource group, using a beam indicated by a spatial relation of the simultaneous spatial relation update Aspect 13: A method of wireless communication performed by a base station, comprising: receiving, from a user equipment (UE), an indication of whether the UE is enabled to receive a simultaneous spatial relation update for a physical uplink control channel (PUCCH) resource group of PUCCH resources that share a same spatial relation; and transmitting, to the UE based at least in part on the indication, the simultaneous spatial relation update for the PUCCH resource group.

Aspect 14: The method of aspect 13, wherein the indication is received in a UE capability information message.

Aspect 15: The method of any of aspects 13-14, wherein the indication is received via radio resource control signaling.

Aspect 16: The method of any of aspects 13-15, wherein the indication indicates that the UE is enabled for simultaneous spatial relation updating of PUCCH resource groups for respective bandwidth parts.

Aspect 17: The method of any of aspects 13-16, wherein the indication identifies a particular value to indicate that the UE is not enabled to receive the simultaneous spatial relation update.

Aspect 18: The method of any of aspects 13-16, wherein the indication identifies a quantity of PUCCH resource groups, in a bandwidth part, that can be enabled for respective simultaneous spatial relation updates, to indicate that the UE is enabled to receive the simultaneous spatial relation update.

Aspect 19: The method of aspect 18, wherein the bandwidth part is on a single component carrier.

Aspect 20: The method of aspect 19, wherein the component carrier is in a millimeter wave frequency band.

Aspect 21: The method of any of aspects 19-20, wherein the component carrier has a time division duplexing configuration.

Aspect 22: The method of any of aspects 13-21, further comprising transmitting a configuration for one or more PUCCH resource groups.

Aspect 23: An apparatus for wireless communication at a device, comprising a processor; memory coupled with the processor; and instructions stored in the memory and executable by the processor to cause the apparatus to perform the method of one or more aspects of aspects 1-12.

Aspect 24: A device for wireless communication, comprising a memory and one or more processors coupled to the memory, the memory and the one or more processors configured to perform the method of one or more aspects of aspects 1-12.

Aspect 25: An apparatus for wireless communication, comprising at least one means for performing the method of one or more aspects of aspects 1-12.

Aspect 26: A non-transitory computer-readable medium storing code for wireless communication, the code comprising instructions executable by a processor to perform the method of one or more aspects of aspects 1-12.

Aspect 27: A non-transitory computer-readable medium storing a set of instructions for wireless communication, the set of instructions comprising one or more instructions that, when executed by one or more processors of a device, cause the device to perform the method of one or more aspects of aspects 1-12.

Aspect 28: An apparatus for wireless communication at a device, comprising a processor; memory coupled with the processor; and instructions stored in the memory and executable by the processor to cause the apparatus to perform the method of one or more aspects of aspects 13-22.

Aspect 29: A device for wireless communication, comprising a memory and one or more processors coupled to the memory, the memory and the one or more processors configured to perform the method of one or more aspects of aspects 13-22.

Aspect 30: An apparatus for wireless communication, comprising at least one means for performing the method of one or more aspects of aspects 13-22.

Aspect 31: A non-transitory computer-readable medium storing code for wireless communication, the code comprising instructions executable by a processor to perform the method of one or more aspects of aspects 13-22.

Aspect 32: A non-transitory computer-readable medium storing a set of instructions for wireless communication, the set of instructions comprising one or more instructions that, when executed by one or more processors of a device, cause the device to perform the method of one or more aspects of aspects 13-22.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," or combinations thereof are intended to be open-ended terms. Further, the phrase "based on" is intended to mean "based, at least in part, on" unless explicitly stated otherwise.

What is claimed is:

1. A user equipment (UE) for wireless communication, comprising:
   one or more memories; and
   one or more processors, coupled to the one or more memories, configured to:
      transmit, to a network entity, an indication of whether the UE is enabled for simultaneous spatial relation updating for a physical uplink control channel (PUCCH) resource group of PUCCH resources configured to share a same spatial relation,
         wherein the indication indicates, for respective bandwidth parts, whether the UE is capable of simultaneous spatial relation updating of PUCCH resource groups for the respective bandwidth parts;
      receive a configuration of the PUCCH resource group; and receive, from the network entity based at least in part on the configuration and the indication, a simultaneous spatial relation update to the PUCCH resource group.

2. The UE of claim 1, wherein the indication is transmitted in a UE capability information message.

3. The UE of claim 1, wherein the indication is transmitted via radio resource control signaling.

4. The UE of claim 1, wherein the indication identifies a particular value to indicate that the UE is not enabled to receive the simultaneous spatial relation update.

5. The UE of claim 1, wherein the one or more processors are further configured to update a spatial relation for a PUCCH resource, of the PUCCH resource group, based at least in part on the simultaneous spatial relation update.

6. The UE of claim 1, wherein the one or more processors are further configured to communicate in a PUCCH resource, of the PUCCH resource group, using a beam indicated by a spatial relation of the simultaneous spatial relation update.

7. The UE of claim 1, wherein the indication indicates a quantity of PUCCH resource groups, in a bandwidth part, that are enabled for simultaneous spatial relation updating.

8. The UE of claim 1, wherein the indication indicates PUCCH resource groups on a single component carrier that are enabled for simultaneous spatial relation updating.

9. A network entity for wireless communication, comprising:
one or more memories; and
one or more processors, coupled to the one or more memories, configured to:
receive an indication of whether a user equipment (UE) is enabled for simultaneous spatial relation updating for a physical uplink control channel (PUCCH) resource group of PUCCH resources that are configured to share a same spatial relation,
wherein the indication indicates, for respective bandwidth parts, whether the UE is capable of simultaneous spatial relation updating of PUCCH resource groups for the respective bandwidth parts;
transmit a configuration of the PUCCH resource group; and
transmit, for the UE based at least in part on the configuration and the indication, a simultaneous spatial relation update to the PUCCH resource group.

10. The network entity of claim 9, wherein the indication is received in a UE capability information message.

11. The network entity of claim 9, wherein the indication is received via radio resource control signaling.

12. The network entity of claim 9, wherein the indication identifies a particular value to indicate that the UE is not enabled to receive the simultaneous spatial relation update.

13. The network entity of claim 9, wherein the one or more processors are further configured to determine whether the PUCCH resource group is to receive the simultaneous spatial relation update based at least in part on the indication, wherein transmitting the simultaneous spatial relation update is based at least in part on determining whether the PUCCH resource group is to receive the simultaneous spatial relation update.

14. The network entity of claim 9, wherein the indication indicates a quantity of PUCCH resource groups, in a bandwidth part, that are enabled for simultaneous spatial relation updating.

15. The network entity of claim 9, wherein the indication indicates PUCCH resource groups on a single component carrier that are enabled for simultaneous spatial relation updating.

16. A method of wireless communication performed by a user equipment (UE), comprising:
transmitting, to a network entity, an indication of whether the UE is enabled for simultaneous spatial relation updating for a physical uplink control channel (PUCCH) resource group of PUCCH resources that are configured to share a same spatial relation,
wherein the indication indicates, for respective bandwidth parts, whether the UE is capable of simultaneous spatial relation updating of PUCCH resource groups for the respective bandwidth parts;
receiving a configuration of the PUCCH resource group; and
receiving, from the network entity based at least in part on the configuration and the indication, a simultaneous spatial relation update to the PUCCH resource group.

17. The method of claim 16, wherein the indication is transmitted in a UE capability information message.

18. The method of claim 16, wherein the indication is transmitted via radio resource control signaling.

19. The method of claim 16, wherein the indication identifies a particular value to indicate that the UE is not enabled to receive the simultaneous spatial relation update.

20. The method of claim 16, further comprising updating a spatial relation for a PUCCH resource, of the PUCCH resource group, based at least in part on the simultaneous spatial relation update.

21. The method of claim 16, further comprising communicating in a PUCCH resource, of the PUCCH resource group, using a beam indicated by a spatial relation of the simultaneous spatial relation update.

22. The method of claim 16, wherein the indication indicates a quantity of PUCCH resource groups, in a bandwidth part, that are enabled for simultaneous spatial relation updating.

23. A method of wireless communication performed by a network entity, comprising:
receiving an indication of whether a user equipment (UE) is enabled for simultaneous spatial relation updating for a physical uplink control channel (PUCCH) resource group of PUCCH resources that are configured to share a same spatial relation,
wherein the indication indicates, for respective bandwidth parts, whether the UE is capable of simultaneous spatial relation updating of PUCCH resource groups for the respective bandwidth parts;
transmitting a configuration of the PUCCH resource group; and
transmitting, for the UE based at least in part on the configuration and the indication, a simultaneous spatial relation update to the PUCCH resource group.

24. The method of claim 23, wherein the indication is received in a UE capability information message.

25. The method of claim 23, wherein the indication is received via radio resource control signaling.

26. The method of claim 23, wherein the indication identifies a particular value to indicate that the UE is not enabled to receive the simultaneous spatial relation update.

27. The method of claim 23, further comprising:
determining whether the PUCCH resource group of the UE is to receive the simultaneous spatial relation update based at least in part on the indication, wherein transmitting the simultaneous spatial relation update is based at least in part on determining whether the PUCCH resource group is to receive the simultaneous spatial relation update.

28. The method of claim 23, wherein the indication indicates a quantity of PUCCH resource groups, in a bandwidth part, that are enabled for simultaneous spatial relation updating.

* * * * *